US010472469B2

(12) United States Patent
Drummond et al.

(10) Patent No.: US 10,472,469 B2
(45) Date of Patent: Nov. 12, 2019

(54) LOW TEMPERATURE STABILITY OF FLUID FLOW IMPROVERS

(71) Applicant: M-I L.L.C., Houston, TX (US)

(72) Inventors: Graham Robert Drummond, Katy, TX (US); Chandrashekhar Yeshwant Khandekar, Katy, TX (US); Pradyumna Avinash Deshpande, Houston, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 14/972,218

(22) Filed: Dec. 17, 2015

(65) Prior Publication Data

US 2016/0185917 A1 Jun. 30, 2016

Related U.S. Application Data

(60) Provisional application No. 62/097,651, filed on Dec. 30, 2014.

(51) Int. Cl.
| | |
|---|---|
| *C08G 77/442* | (2006.01) |
| *C09K 8/524* | (2006.01) |
| *C08L 83/10* | (2006.01) |
| *C08G 77/455* | (2006.01) |

(52) U.S. Cl.
CPC ......... *C08G 77/442* (2013.01); *C08L 83/10* (2013.01); *C09K 8/524* (2013.01); *C08G 77/455* (2013.01)

(58) Field of Classification Search
None
See application file for complete search history.

(56) References Cited

U.S. PATENT DOCUMENTS

| | | | |
|---|---|---|---|
| 3,249,535 A | 5/1966 | Keil | |
| 4,045,360 A | 8/1977 | Fischer et al. | |
| 4,894,175 A | 1/1990 | Koerner et al. | |
| 2007/0057226 A1* | 3/2007 | Forbus | C09K 5/10 252/73 |
| 2007/0213231 A1 | 9/2007 | Jennings | |

(Continued)

OTHER PUBLICATIONS

Rodriguez, et al., "Correlation of silicone incorporation into hybrid acrylic coatings with the resulting hydrophobic and thermal properties," Macromolecules, 2008, vol. 41, No. 22, pp. 8537-8546.

(Continued)

*Primary Examiner* — Jeffrey D Washville
(74) *Attorney, Agent, or Firm* — Jeffrey D. Frantz

(57) ABSTRACT

Embodiments relate to fluid flow improvers containing a copolymer with a siloxane group incorporated thereto. The fluid flow improvers may include polymer/copolymer having the characteristic of inhibiting wax/paraffin crystalline growth, modifying wax/paraffin crystal growth, dispersing of wax/paraffin, preventing the deposition of wax/paraffin, aiding the removal of wax/paraffin or depressing of the pour point of a wax/paraffin-containing fluid. The fluid flow improvers described may be employed alone, or may be used in combination with one or more additives for improving the low temperature flowability and/or other properties and may also be employed in combination with one or more organic solvents and/or aqueous solvents.

17 Claims, 3 Drawing Sheets

25% PDMS grafted polyalkylacrylate

25% standard polyalkylacrylate

(56) References Cited

U.S. PATENT DOCUMENTS

| | | | | |
|---|---|---|---|---|
| 2008/0033119 | A1* | 2/2008 | Asirvatham | A61K 8/891 |
| | | | | 525/471 |
| 2009/0184285 | A1* | 7/2009 | Krull | C10L 1/146 |
| | | | | 252/71 |
| 2010/0126981 | A1* | 5/2010 | Heintz | C08F 259/08 |
| | | | | 219/482 |
| 2011/0046025 | A1 | 2/2011 | Rodrgues et al. | |

OTHER PUBLICATIONS

International Search Report and Written Opinion for the equivalent International patent application PCT/US2015/066221 dated Mar. 31, 2016.

International Preliminary Report on Patentability for the equivalent International patent application PCT/US2015/066221 dated Jul. 13, 2017.

Examination Report for the equivalent Canadian patent application 2972768 dated May 4, 2018.

\* cited by examiner

LOW TEMPERATURE STABILITY OF FLUID FLOW IMPROVERS

BACKGROUND

Hydrocarbon fluids, during the production and transportation from reservoir to the surface and onward to refinery undergo pressure and temperature changes. These changes along with changes in operating conditions can lead to destabilization and precipitation of various components in the fluids (e.g., paraffins, asphaltenes, scales). Under favorable conditions, these precipitated components can cause significant flow assurance challenges including, but not limited to, an increase in fluid viscosity and deposition of solids on pipeline surfaces. These, in turn, can then cause numerous operational challenges such as flow restriction in a pipeline, increased solids during pigging operations leading to decreased cleaning efficiency, or higher pipeline back pressure leading to lower throughput. Various thermal, mechanical and chemical methods are used to prevent and mitigate the precipitation and deposition of these components and to subsequently avoid costly delays due to their interference in the production and transportation process. These remedial methods include pigging or scraping, insulating equipment and flow lines to prevent loss of heat, applying heat by means of a heated liquid (e.g., hot oil or hot water), using a heat generated reaction, or the application of inhibitors, dispersants or solvents.

Paraffin precipitation and deposition and its effect of fluid flow in a pipeline remains one of the biggest challenge in the oilfield industry. Precipitation of paraffin ($C_nH_{2n+2}$) from hydrocarbons is a function of primarily temperature, however there are other parameters, such as pressure, that affect the solubility of paraffin in hydrocarbon fluids and can cause its precipitation. These precipitated paraffins, under favorable conditions tend to form deposits inside pipelines, vessels and other oilfield equipment causing several problems such as reduction in the flow, higher back pressures, increased fluid viscosity, higher solids in the fluid leading to stable emulsions and oil water separation problems. To overcome these challenges, various thermal, mechanical and chemical methods are used in the oilfield industry including pigging, scraping, hot oiling and using paraffin inhibitors, pour point depressants, paraffin dispersants, paraffin solvents and combinations thereof.

Paraffin inhibitors, typically crystalline/amorphous polymers, also known as wax crystal modifiers, are used in oil field industry to delay the onset of wax precipitation in hydrocarbon fluids and to mitigate the extent of wax deposition on the metal surfaces. These polymers, usually formulated in aliphatic or aromatic solvents, are injected above the wax appearance temperature ("WAT"). WAT is defined as the temperature at which a detectable amount of a solid phase forms upon cooling in the time frame of the measurement at a given pressure. A part of the wax inhibitor, which co-crystallizes with the paraffins has a structure that is similar to the waxes and is nonpolar is nature. There is typically a polar component present in the structure which limits the degree of co-crystallization. The paraffin inhibitors/wax crystal modifiers interfere with the wax crystallization by modifying the wax crystal morphology. The ill formed crystal (also called a malcrystal) cannot form networks thereby preventing deposition of wax on the pipeline surface.

Paraffin inhibitors/wax crystal modifiers are usually polymers that are formulated in solvents (aliphatic or aromatic) and, typically, polymers exhibit limited solubility in these solvents. Solubility of these polymers in the solvents also decreases dramatically at low temperatures which significantly limits the amount of polymer that can be incorporated into a solution at low temperature. In a deep-water or in a low temperature application, where it is important for the inhibitor solution to remain stable at the application temperature, only very dilute solutions of the wax crystal modifier/paraffin inhibitor can be formulated and applied.

Various techniques have been used to improve low temperature stability of wax crystal modifiers/paraffin inhibitors. This includes dilution, addition of surface active agents, producing the polymers in an emulsion or a dispersion form.

DETAILED DESCRIPTION

Figure 1:
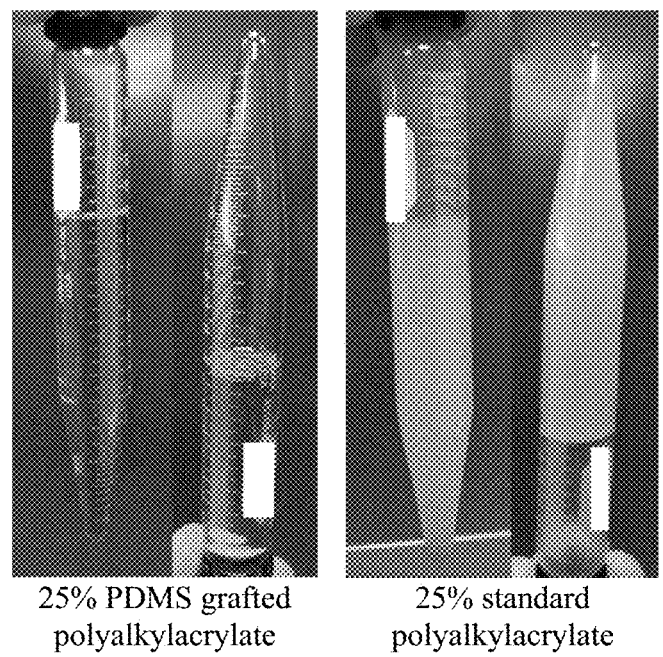
FIG. 1 shows PDMS-grafted polyalkylacrylate and standard polyalkylacrylate samples after being subjected to a refrigerated centrifuge method test.

Embodiments disclosed herein are directed to compositions containing a flow improver (i.e., a wax/paraffin crystal modifier, a wax/paraffin inhibitor, a wax/paraffin deposition inhibitor, a wax/paraffin dispersant, a wax/paraffin removal aid, a pour point depressant, etc.) which includes at least one copolymer containing at least one siloxane group and can be used to control wax deposition/reduce pour point or improve rheology in paraffinic hydrocarbons. The flow improver containing at least one graft copolymer which has at least one siloxane group exhibits improved low temperature properties when dissolved in a solvent than the corresponding polymers that do not contain a siloxane group. A siloxane group is a functional group possessing a Si—O—Si linkage. Siloxanes may be oligomeric or polymeric, with polymeric siloxanes commonly referred to as silicones.

In one aspect, embodiments disclosed herein relate generally to improving the low temperature viscosity and stability of flow improvers including wax inhibitors, wax crystal modifiers and pour point depressants. More specifically, embodiments disclosed herein utilize polymers containing at least one graft copolymer containing at least one siloxane groups as wax inhibitors/wax crystal modifier/wax deposition inhibitor or a pour point depressant which exhibits lower viscosity at low temperature (e.g., 4° C.) than the corresponding polymer which does not contain a siloxane group.

In one or more embodiments, a flow improver, be it a wax inhibitor, wax crystal modifier, wax dispersant or a pour point depressant, may be a functionalized polymer or copolymer, having a dendrimeric or hyperbranched architecture and containing at least one siloxane group. A copolymer may be defined as a polymer that results from the polymerization of at least two distinct monomers and may be of. A copolymer according to embodiments herein may be a random copolymer, alternating copolymer, block copolymer, and/or a graft copolymer. A random copolymer is a polymer in which the sequence of monomer residue at a particular point in the polymer chain does not follow a regular repeating pattern. For example, -A-A-A-B-A-B-B-B-B-A- or -A-B-A-B-A-A-A-B-A-B- may both be considered random copolymers. An alternating copolymer is a polymer where the sequence of monomer follows an alternating pattern, for example -A-B-A-B-A-B-. A block copolymer is commonly known as a polymer that is made up of blocks of different polymerized monomers. For example, a block of polymer A may be covalently attached to a block of copolymer B to form a block copolymer having the simplified structure -A-A-A-A-B-B-B-B-. Lastly, graft copolymers are copolymers having single main or backbone chain with one or more structurally distinct side chains that have been grafted either to or from the main chain.

Formula (1) shows a generalized example of a flow improver having a polyacrylate backbone chain with a siloxane group grafted thereto, according to one or more embodiments of the present application:

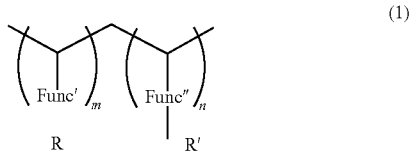

(1)

wherein Func' and Func" are optional functional groups which may be the same or may be different, R is an alkyl chain of between about 10 and 50 carbons in length, R' is a siloxane group, and m<=>n. It should be noted that this figure is a simplified structure and does not embody all of the structures that the current claim can be applied to. Other possibilities include the alkyl chains in R may be of differing lengths within the same structure, and R should just be taken to mean any length of alkyl chain between 10 and 50 carbons in length. It may also be possible that the structure includes a third unit, different from m or n, which corresponds to either a different monomer or a differently modified version of m or n. In other embodiments, the main chain of the graft copolymer may be a polymer selected from polyacrylates, poly olefin-co-maleic anhydrides, poly olefin-co-vinyl acetates, polyalkylacrylates, polyalkylmethacrylates, poly alkyl phenols and polyamides. Further, the siloxane group may be a polysiloxane, alkylsiloxane, polyalkylsiloxane, or polydimethylsiloxane (PDMS) group.

In one or more embodiments, a fluid flow improver containing at least one graft copolymer containing at least one siloxane group may be added to a hydrocarbon fluid to reduce the hydrocarbon viscosity or tendency for the hydrocarbon fluid to gel or precipitate solids. The hydrocarbon fluids to which the present disclosure may be applicable include paraffin-containing fluids such as wax-containing oils and natural gas liquids, and for example crude oil, shale oil, petroleum, tar sands oil, and mixtures thereof. In some embodiments, the siloxane containing flow improver may be added to the hydrocarbon fluid in an amount ranging from about 1 part per million to about 5000 parts per million. In more particular embodiments, the siloxane containing flow improver may be added to the hydrocarbon fluid in an amount ranging from about 100 parts per million to about 2500 parts per million. In some embodiments, the particular amount added may depend upon the compositional chemistry of the hydrocarbon fluid to which the siloxane containing flow improver is being added. In other embodiments, at least one copolymer including at least one siloxane group may be added to an oilfield production chemical to increase the chemical's low-temperature stability.

The fluid flow improvers described herein may be employed alone, or may be used in combination with one or more additives for improving the low temperature flowability and/or other properties, which are in use in the art or know from the literature. Such additives may be, for example, oxidation inhibitors, corrosion inhibitors, detergents, storage stabilizers, lubricity agents or other pour point depressants. The fluid flow improvers described herein may also be employed in combination with one or more organic solvents and/or aqueous solvents.

Additionally, the fluid flow improvers described herein may be added to a hydrocarbon fluid after its extraction from a well, prior to the hydrocarbon fluid being extracted from the well, or a combination thereof. In an embodiment, the well is located underwater. In an embodiment, the well is a deep water well located at least 1000 meters below the surface of the water. In one embodiment, the fluid flow improver is added to a subterranean well. In another embodiment, the flow improver may be added to a hydrocarbon fluid produced from a well at the well head or at the surface. In still another embodiment, the fluid flow improver is added to a hydrocarbon fluid prior to transporting the hydrocarbon fluid in a pipeline or a tank.

EXAMPLE 1

The cold finger technique is widely used in the oil industry to evaluate the performance of wax inhibitors. The cold finger technique consists of immersing a cooled "finger" or tube into heated fluids of interest to encourage wax deposition on the surface of the "finger". The cooled finger simulates a pipe wall through which a warmer produced fluid may flow through. In Example 1 cold finger tests were carried out on several different crude oils (i.e., hydrocarbon fluids) from the South Texas region to evaluate the effect of a polydimethylsiloxane (PDMS) grafted alkylacrylate (i.e., siloxane containing flow improver) on wax deposition in comparison to a commercial wax inhibitor product and non-grafted polyalkylacrylate. An 80 mL volume of each crude oil sample was heated by water bath to about 170° F. and prior to the addition of the wax inhibitor or siloxane containing flow improver. Upon addition of the wax inhibitor or siloxane containing flow improver the jars of crude oil are sealed and shaken before being placed back into the water bath at 170° F. for one hour. The jars are then attached to a cold finger apparatus and the apparatus (including the jars) is placed in a water bath preheated to 130° F. with stirring. After 30 minutes at 130° F. with stirring, the test is started by setting the bath temperature to 80° F. and cooling the fingers to 35° F. After 20 hours under these conditions, the apparatus is removed from the bath, and the deposit is retrieved from the finger and weighed.

The weight of the deposit formed by a fluid containing a wax inhibitor treatment is compared to the weight of a deposit formed by a fluid not-containing a wax inhibitor treatment to calculate a percentage inhibition for each treatment. Percentage inhibition is calculated using the following formula:

$$\text{Percentage inhibition} = \frac{W_U - W_T}{W_U} \times 100$$

Where $W_U$ is the weight of deposit formed from the fluid not containing wax inhibitor treatment and $W_T$ is the weight of deposit formed from the fluid containing wax inhibitor treatment. Table 1 shows the percentage inhibition results obtained by the cold finger test.

TABLE 1

| Wax Inhibitor | Fluid # | | | | | | |
|---|---|---|---|---|---|---|---|
| | 1 | 2 | 3 | 4 | 5 | 6 | 7 |
| Commercial Product | 68% | 66% | 64% | 62% | 61% | 65% | 77% |
| Polyalkylacrylate | 36% | 36% | 48% | 43% | 52% | 39% | 53% |
| PDMS-grafted Polyalkylacrylate | 75% | 62% | 52% | 65% | 70% | 49% | 89% |

The cold finger results showed the general trend that the PDMS-grafted polyaklyacrylate outperformed the standard polyalkylacrylate and in most cases matched or outperformed the commercial wax inhibitor product with respect to wax inhibition in a hydrocarbon fluid.

EXAMPLE 2

Figure 2:
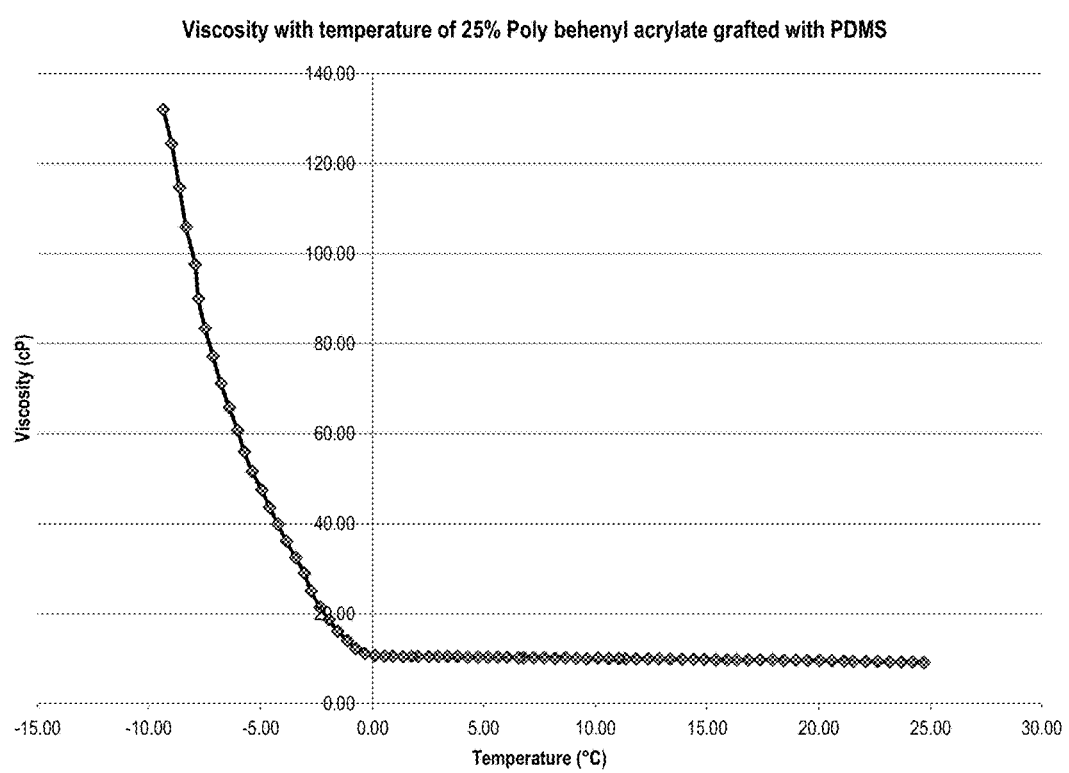
FIG. 2 shows the viscosity of PDMS-grafted poly behenyl acrylate as a function of temperature (° C.).
Figure 3:
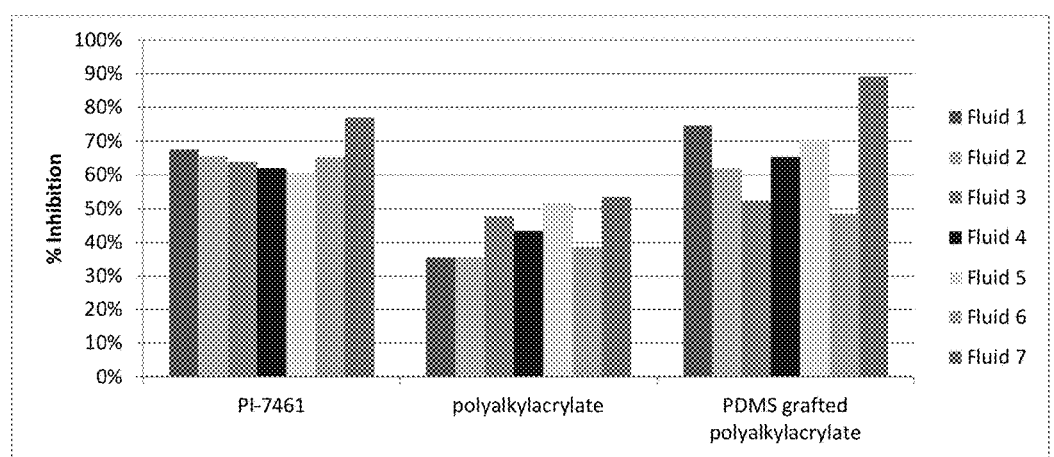
FIG. 3 is a graph showing the percentage of wax inhibition for seven natural crude oils that were experimentally treated with a fluid flow improver according to the present disclosure.

The low temperature stability of PDMS-grafted polyalkylacrylate and standard polyalkylacrylate having similar side chain lengths were measured using a refrigerated centrifuge method. Solutions of 25 weight percent PDMS-grafted polyalkylacrylate and standard polyalkylacrylate were prepared in xylene. A temperature of 4° C. was selected as the refrigerated centrifuge temperature as this temperature is widely used in the oil industry as a standard minimum sea-bed temperature for the majority of producing locations. The solution were centrifuged in the refrigerated centrifuge at 4° C. for six hours. After this time the samples were removed from the centrifuge and their appearance observed, pictures of which are shown in FIG. 1. The PDMS-grafted polyalkylacrylate sample remains a clear and free flowing liquid, while the standard polyalkylacrylate sample has the appearance of an opaque solid indicating the sample is below its pour point. FIG. 2 illustrates change in viscosity for 25 percent poly behenyl acrylate grafted with PDMS relative to temperature. Of note is that the viscosity of the poly behenyl acrylate grafted with PDMS remains relatively constant to temperatures near freezing, as would be encountered in deep sea environments.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method comprising:
    treating a hydrocarbon fluid with a fluid flow improver containing a polymer with at least one siloxane group grafted thereto, and
    reducing, with the fluid flow improver, a viscosity of the hydrocarbon fluid or a tendency of the hydrocarbon fluid to gel or precipitate solids,
    wherein the polymer is a graft copolymer that complies with the following formula:

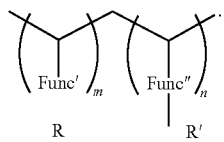

wherein Func' and Func" are optional functional groups which may be the same or different, R is an alkyl chain of between about 10 and 50 carbons in length, R' is a siloxane group, and m<=>n.

2. The method of claim 1 wherein the polymer is selected from a group consisting of polyacrylates, polyolefin-co-maleic anhydrides, polyolefin-co-vinyl acetates, polyalkylacrylates, polyalkylmethacrylates, polyalkylphenols, and polyamides.

3. The method of claim 1 wherein the polymer/copolymer is of dendrimeric or hyperbranched architecture.

4. The method of claim 1 wherein the siloxane group is selected from a group consisting of polysiloxane, alkylsiloxane, polyalkylsiloxane, and polydimethylsiloxane.

5. The method of claim 1, wherein the flow improver is combined with the hydrocarbon fluid in an amount ranging from 1 part per million to 5000 parts per million.

6. The method of claim 1 wherein the polymer contains functional groups that are alkyl chains 10-50 carbon atoms in length.

7. The method of claim 1, wherein the flow improver further comprises one or more organic solvents and/or aqueous solvents.

8. The method of claim 1, wherein the hydrocarbon fluid further comprises one or more additives selected from the group consisting of oxidation inhibitors, corrosion inhibitors, detergents, storage stabilizers, lubricity agents and pour point depressants.

9. A The method of claim 1, wherein the flow improver is added to the hydrocarbon fluid after the hydrocarbon fluid is extracted from a subterranean formation, prior to the hydrocarbon fluid being extracted from the subterranean formation, or combinations thereof.

10. The method of claim 1, wherein R' is polydimethylsiloxane.

11. A method comprising:
    treating a hydrocarbon fluid with a fluid flow improver containing a polymer with at least one siloxane group grafted thereto,
    wherein the polymer is a graft copolymer that complies with the following formula:

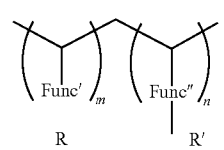

wherein Func' and Func" are optional functional groups which may be the same or different, R is an alkyl chain of between about 10 and 50 carbons in length, R' is a siloxane group, and m<=>n.

12. The method of claim 11, wherein R' is a siloxane group selected from a group consisting of polysiloxane, alkylsiloxane, polyalkylsiloxane, and polydimethylsiloxane.

13. The method of claim 11, wherein R' is polydimethylsiloxane.

14. The method of claim 11, wherein the flow improver combined with the hydrocarbon fluid in an amount ranging from 1 part per million to 5000 parts per million.

15. The method of claim 11, wherein the polymer is a polyalkylacrylate.

16. The method of claim 11, wherein the hydrocarbon fluid further comprises one or more additives selected from the group consisting of oxidation inhibitors, corrosion inhibitors, detergents, storage stabilizers, lubricity agents and pour point depressants.

17. The method of claim 1, further comprising:
   placing the treated hydrocarbon fluid in a subterranean formation.

* * * * *